US009387903B2

(12) United States Patent
O'Connell

(10) Patent No.: US 9,387,903 B2
(45) Date of Patent: Jul. 12, 2016

(54) CHILDREN BALANCING VEHICLE

(71) Applicant: Yvolve Sports Ltd., Dublin (IE)

(72) Inventor: Thomas O'Connell, Castleblayney (IE)

(73) Assignee: YVOLVE SPORTS LTD., Dublin (IE)

( * ) Notice: Subject to any disclaimer, the term of this patent is extended or adjusted under 35 U.S.C. 154(b) by 0 days.

(21) Appl. No.: 14/317,247

(22) Filed: Jun. 27, 2014

(65) Prior Publication Data

US 2015/0130150 A1    May 14, 2015

(30) Foreign Application Priority Data

Nov. 13, 2013    (CN) .................... 2013 2 0713707 U

(51) Int. Cl.
| | | |
|---|---|---|
| *B62K 9/00* | (2006.01) | |
| *B62M 1/00* | (2010.01) | |
| *B62K 19/18* | (2006.01) | |
| *B62K 15/00* | (2006.01) | |

(52) U.S. Cl.
CPC . *B62K 19/18* (2013.01); *B62K 9/00* (2013.01); *B62K 15/00* (2013.01); *B62K 2015/001* (2013.01)

(58) Field of Classification Search
CPC ............ A61H 3/04; B62K 9/00; B62K 19/24; B62K 15/00; B62K 19/18; B62K 2015/001; B62M 1/00
USPC ............ 280/87.01, 87.021, 87.041, 263, 274, 280/288.2, 288.3
See application file for complete search history.

(56) References Cited

U.S. PATENT DOCUMENTS

| | | | | |
|---|---|---|---|---|
| 1,457,842 | A * | 6/1923 | Kashmere et al. | 280/87.05 |
| 1,772,231 | A * | 8/1930 | Smith | 280/274 |
| 2,153,249 | A * | 4/1939 | Henry | 280/281.1 |
| 3,608,917 | A * | 9/1971 | Cogliano | 280/7.16 |
| 3,827,719 | A * | 8/1974 | Lohr et al. | 280/259 |
| 4,838,569 | A * | 6/1989 | Ford | 280/275 |
| 5,041,043 | A * | 8/1991 | Hoke | 446/452 |
| 5,129,666 | A * | 7/1992 | Lai | 280/281.1 |
| 2004/0070165 | A1 * | 4/2004 | Liebetrau et al. | 280/259 |
| 2004/0245743 | A1 * | 12/2004 | Chao | B62K 3/10 280/278 |
| 2010/0219608 | A1 * | 9/2010 | Fioravanti et al. | 280/281.1 |
| 2011/0006501 | A1 * | 1/2011 | Guzik et al. | 280/274 |
| 2012/0013101 | A1 * | 1/2012 | Huang | B62K 3/04 280/287 |
| 2012/0098233 | A1 * | 4/2012 | Groendal | 280/283 |
| 2012/0187650 | A1 * | 7/2012 | Chen | B62K 9/00 280/263 |

\* cited by examiner

*Primary Examiner* — Frank Vanaman
(74) *Attorney, Agent, or Firm* — Millman IP Inc.

(57) ABSTRACT

A children's balancing vehicle comprising a front vehicle rack, a handle set, a rear fork, a seat tube and a fastening component. The front vehicle rack has a front fork. A front wheel is assembled below the front fork while a stand pipe is disposed thereon. A vehicle rack body is disposed at a rear of the stand pipe. The handle set is disposed onto the stand pipe. The rear fork has a plastic main body. A rear wheel is disposed below the rear fork. The seat tube passes between the vehicle rack body and the plastic main body of the rear fork. A seat cushion is disposed onto the seat tube. The fastening component passes through the vehicle rack body, the plastic main body of the rear fork and the seat tube so as to mutually assemble and fasten them. Assembly of the children's balancing vehicle can be completed by using simple fastening components.

11 Claims, 4 Drawing Sheets

CHILDREN BALANCING VEHICLE

BACKGROUND OF THE INVENTION

1. Field of the Invention

The invention relates to a children's balancing vehicle, and more particularly to a children's balancing vehicle having a simple structure capable of being conveniently assembled.

2. Description of the Related Art

According to current children's bicycles, auxiliary wheels are required and mounted on either side of a bicycle's rear wheel. However, when children are in a learning stage of riding these bicycles, they are unable to perform the two motions of handle control and stepping on the pedals of the bicycle. Typically, children use their feet to push against the ground for advancing, and the motion may harm the feet while colliding with the bicycle pedals. In addition, because auxiliary wheels are mounted on either side of the rear wheel of bicycles, children may excessively rely on the auxiliary wheels during bicycle riding This can render children incapable of quickly learning the balance of riding bicycles, resulting in prolonging the time of learning. Further, while relying upon auxiliary wheels, the oblique angle between the auxiliary wheels and the vehicle bodies may be gradually increased to bring about danger of overturn during riding. A balance bike capable of training equilibratory sense to children then is advantageous.

A conventional balance bike has a front fork at a front side of the vehicle rack. A top end and a bottom end of the front fork are combined with a steering head and a front wheel, and a rear wheel is disposed at a rear end of the vehicle rack. In comparison to a conventional bicycle, the balance bike does not have transmission structures of pedals, tooth discs and chains. When a child rides the balance bike, the counter-reaction force generated by feet of the child stepping on the ground drives the balance bike to slide forward with inertia force. The child becomes familiar with the motion of the two-wheel vehicle, to help train equilibratory sense and brain coordination. Therefore, when the child rides a conventional bicycle, they may have equilibratory sense and confidence to easily ride the bicycle. However, the structure of a conventional balance bike is complicated, and assembly is not convenient. Moreover, in the structure of some balance bikes, the vehicle rack is integrated and unable to be detached and assembled, resulting in inconvenience.

SUMMARY OF THE INVENTION

In view of the foregoing problems, it is a primary objective of the present invention is to provide a children's balancing vehicle having a simple structure and capable of being conveniently assembled.

In an aspect, the children's balancing vehicle of the present invention comprises a front vehicle rack, a handle set, a rear fork, a seat tube and a fastening component. The front vehicle rack has a front fork. A front wheel is assembled below the front fork while a stand pipe is disposed thereon. A vehicle rack body is disposed at a rear of the stand pipe. The handle set is disposed onto the stand pipe. The rear fork has a plastic main body. A rear wheel is disposed below the rear fork. The seat tube passes between the vehicle rack body and the plastic main body of the rear fork. A seat cushion is disposed onto the seat tube. The fastening component passes through the vehicle rack body, the plastic main body of the rear fork and the seat tube so as to mutually assemble and fasten them. Assembly of the whole children's balancing vehicle can be completed by using simple fastening components. The children's balancing vehicle can allow children to become familiar with the motion of two-wheel vehicles, thereby training the balance and coordination of brains of children.

Assembly of the children's balancing vehicle can be completed by using simple fastening components. The children's balancing vehicle can enable children to become familiar with the motion of two-wheel vehicles, thereby training the balance and coordination of brains of children. After children learn how to balance and control bicycles, the present invention can become a mode of normal bicycle by replacing the rear fork with one having a pedal set through the fastening component, so that children learn the motion of the pedals. Since difficult balance and control have been learned, the forward motion can be quickly learned by cooperating with the pedals so as to reduce the time of riding the vehicle.

BRIEF DESCRIPTION OF THE DRAWINGS

The detailed structure, operating principle and effects of the present invention will now be described in more detail, with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
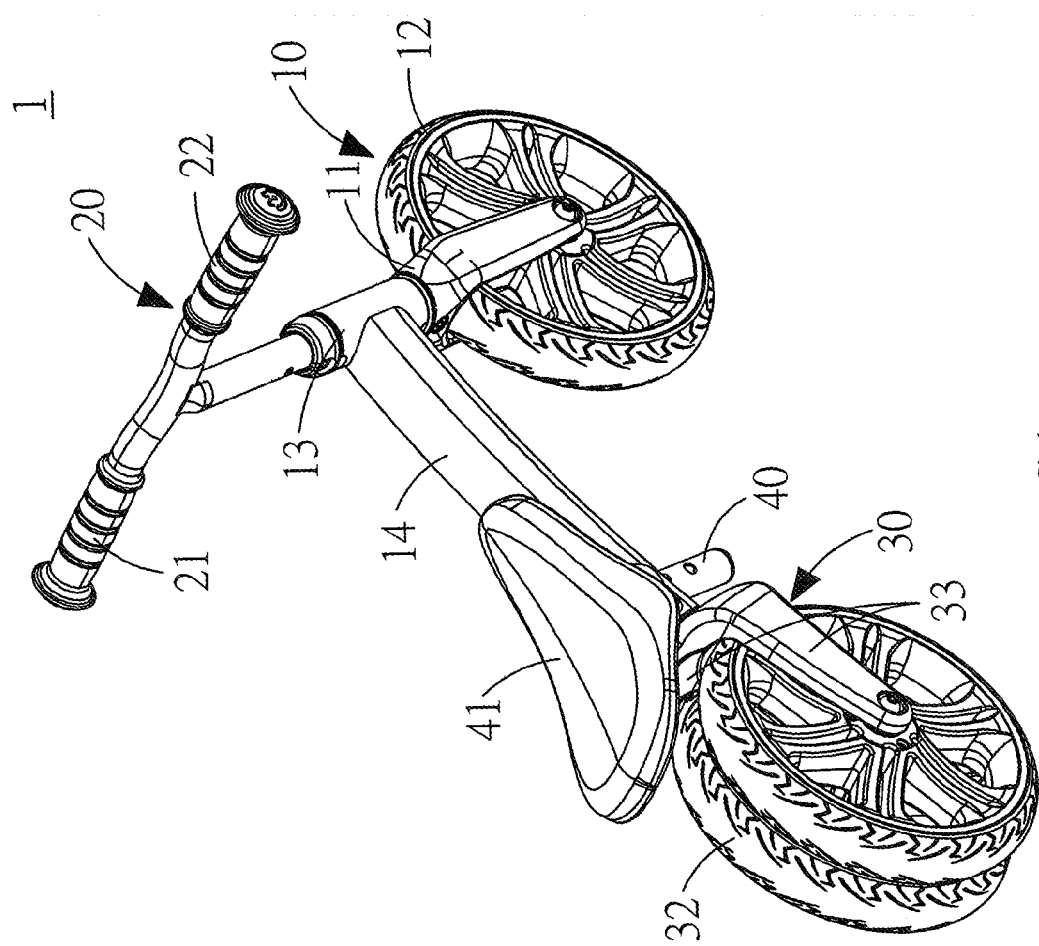
FIG. 1 is a structural three-dimensional diagram of a children's balancing vehicle of the present invention.
Figure 2:
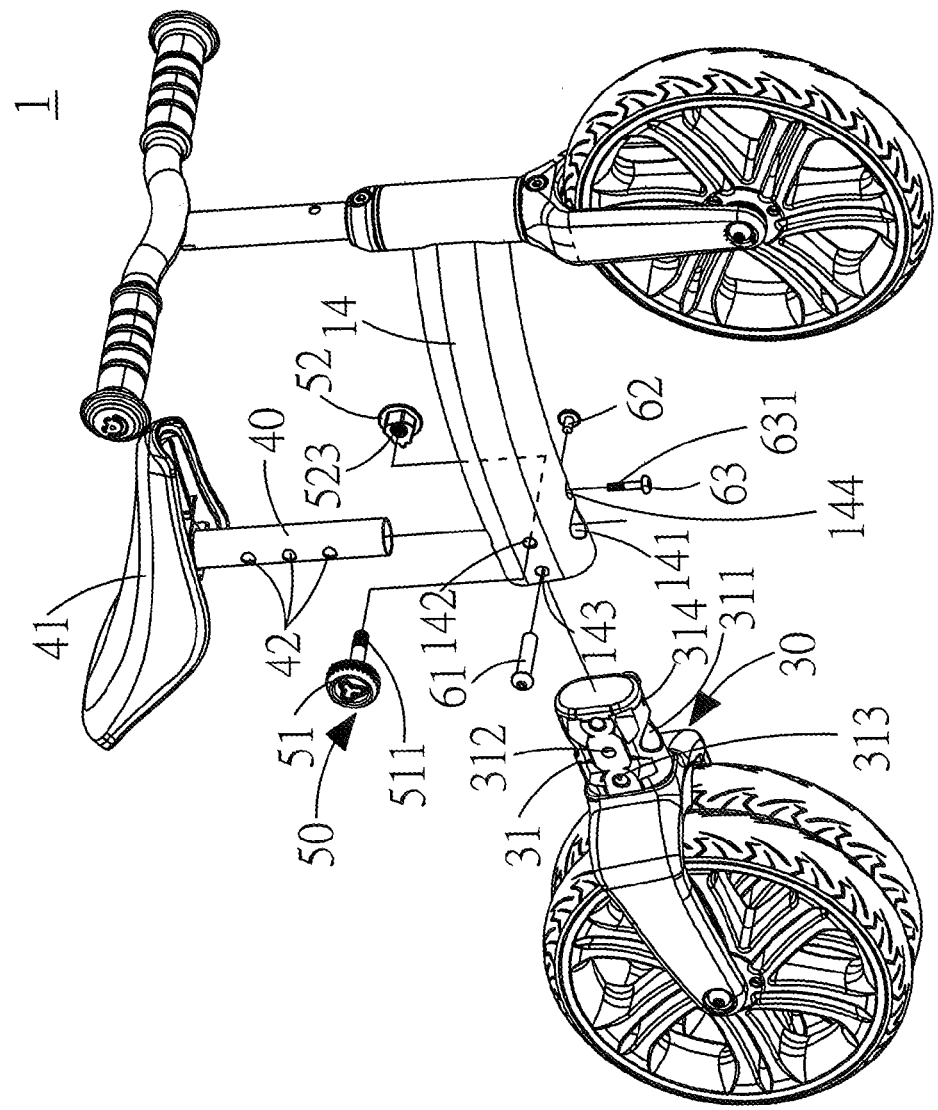
FIG. 2 is a structural decomposition drawing of a children's balancing vehicle of the present invention.

With reference to FIG. 1 which shows a structural three-dimensional drawing of a children's balancing vehicle and FIG. 2 which shows a structural decomposition drawing of a children's balancing vehicle. The children's balancing vehicle 1 comprises a front vehicle rack 10, a handle set 20, a rear fork 30, a seat tube 40 and a fastening component 50.

The front vehicle rack 10 has a front fork 11. A front wheel 12 is assembled below the front fork 11, while a stand pipe 13 is disposed onto the front vehicle rack 10. A vehicle rack body 14 is disposed at a rear of the stand pipe 13. The vehicle rack body 14 is a tubular body. A first through-hole 141 vertically passes through the vehicle rack body 14. The handle set 20 is disposed onto the stand pipe 13 and has a left and right handles 21, and 22, held by a user and used for controlling the forwarding direction of the front wheel 12.

The rear fork 30 has a plastic main body 31 disposed at a rear of the vehicle rack body 14. A rear wheel 32 is assembled below the rear fork 30. In the embodiment shown in the drawing, two fork arms 33 are disposed at the rear of the plastic main body 31 and provided for disposing the rear wheel 32 between the two fork arms 33. The plastic main body 31 is disposed with a second through-hole 311 fit at the vehicle rack body.

The seat tube 40 passes between the vehicle rack body 14 and the plastic main body 31 of the rear fork, wherein a seat cushion 41 is disposed onto the seat tube 40.

The fastening component 50 passes through the vehicle rack body 14, the plastic main body 31 of the rear fork and the seat tube 40 so as to mutually assemble and fasten three elements.

Figure 3:
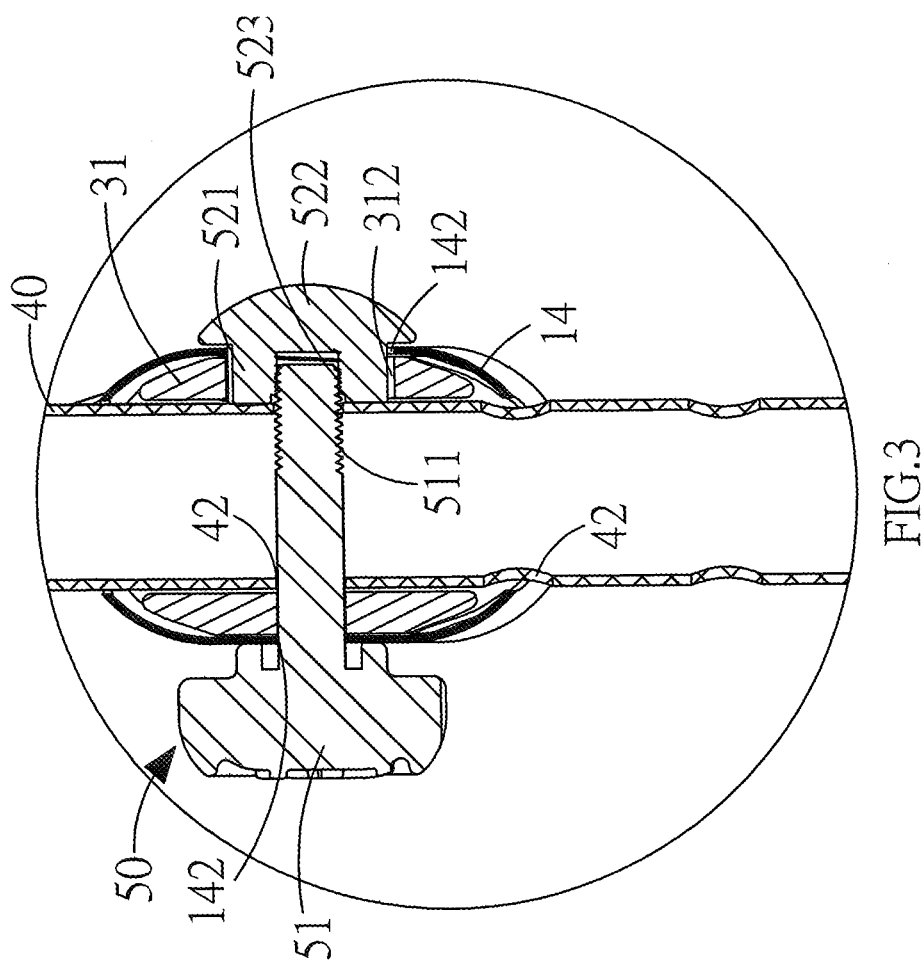
FIG. 3 is a structural schematic diagram of a children's balancing vehicle of the present invention.

While assembling children's balancing vehicle 1, the plastic main body 31 is firstly fit in from the rear of the vehicle rack body 14 to allow the second through-hole 311 corresponding to the first through-hole 141, and the seat tube 40 sequentially passes through the first through-hole 141 and the second through-hole 311. A first, second and third assembling holes 142, 312, 42 corresponding to each other are respectively through the vehicle rack body 14, the plastic main body 31 and the seat tube 40. With reference to FIG. 3, the fastening component 50 can pass and fasten the assembling holes, and the first assembling hole 142, the second assembling hole 312 and the third assembling hole 42 individually pierce through the vehicle rack body 14, the plastic main body 31 and the seat tube 40, wherein the fastening component 50 has a first fastening member 51 and a second fastening member 52. During assembly, the first fastening member 51 sequentially passes through the first assembling hole 142, the second assembling hole 312 and the third assembling hole 42. The second fastening member 52 is provided for fastening the first fastening member 51 from another side of the vehicle rack body 14 to achieve the effect of mutually assembling and fastening the vehicle rack body 14, the plastic main body 31 and the seat tube 40.

The second fastening member 52 has a protrusion portion 521 and a head portion 522 located at one end of the protrusion portion 521. The protrusion portion 521 can pierce in the first assembling hole 142 of the vehicle rack body. The head portion 522 is exposed to the vehicle rack body 14. A tail of the first fastening member 51 has a plurality of external screw threads 511, while the protrusion portion 521 of the second fastening member has correspondingly internal screw threads 523. With the external screw threads 511 mutually screwed to the internal screw threads 523, the first fastening member 51 and the second fastening member 52 assemble and fasten the vehicle rack body 14, the plastic main body 31 and the seat tube 40.

Moreover, the seat tube 40 has a plurality of third assembling holes 42 vertically arranged at spacing. As shown in FIG. 2 and FIG. 3, the third assembling holes 42 at different heights and locations can be selected to perform assembling and positioning so that the user can regulate the height required for the seat cushion 41.

Figure 4:
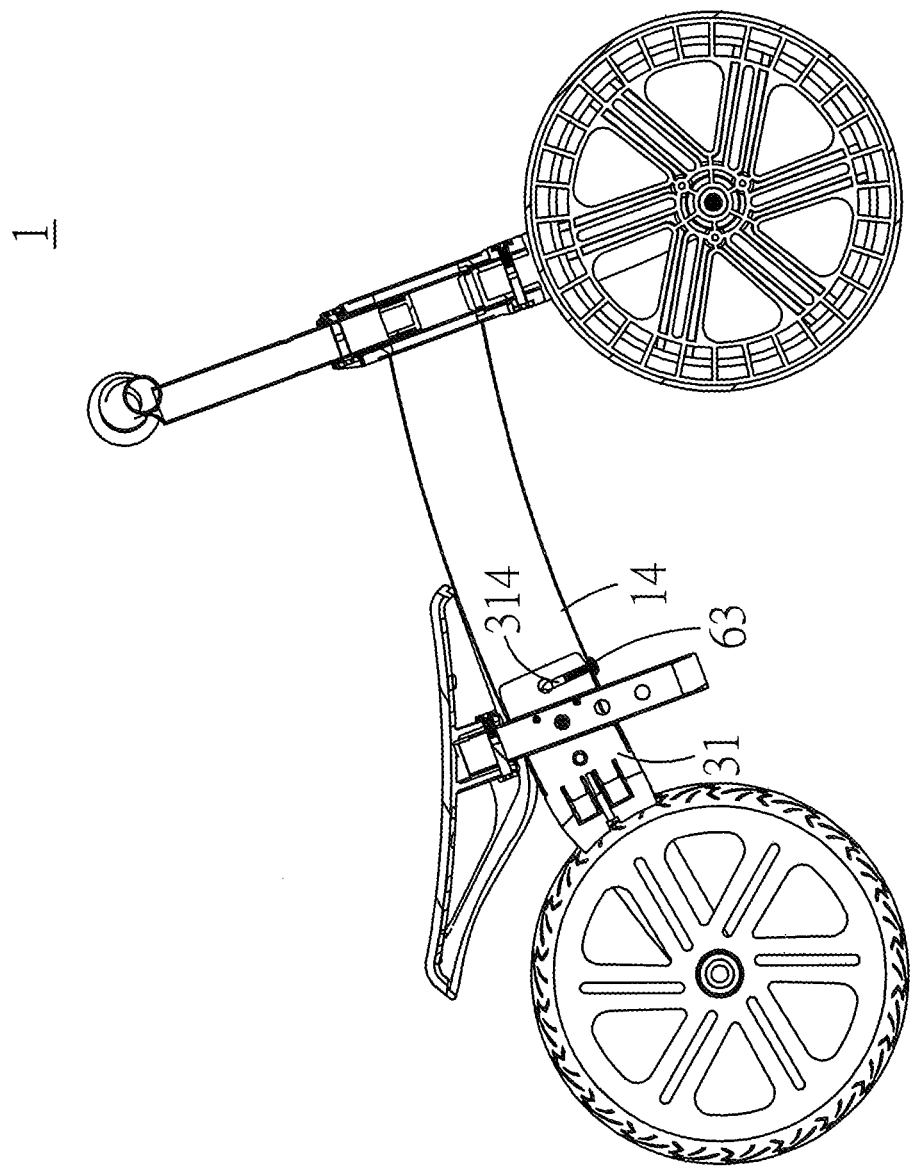
FIG. 4 is another structural schematic diagram of a children's balancing vehicle of the present invention.

At least a set of auxiliary fastening component 60 is further disposed between the vehicle rack body 14 and the plastic main body 31. As shown in FIG. 2, the auxiliary fastening component 60 has a first auxiliary fastening member 61 and a second auxiliary fastening member 62 fastened to each other. A fourth assembling hole 143 and a fifth assembling hole 313 corresponding to each other are disposed between the vehicle rack body 14 and the plastic main body 31. The fourth assembling hole 143 and the fifth assembling hole 313 respectively pierce through the vehicle rack body 14 and the plastic main body 31. With reference to FIG. 4, the auxiliary fastening component 60 has a third auxiliary fastening member 63. A sixth assembling hole 144 and a seventh assembling hole 314 corresponding to each other are disposed to the vehicle rack body 14 and the plastic main body 31. The sixth assembling hole 144 and the seventh assembling hole 314 are respectively located to the vehicle rack body 14 and below the plastic main body 31. Inner screw threads (not shown in the figure) are disposed inside the seventh assembling hole 314. The third auxiliary fastening member 63 has a plurality of external screw threads 631 and pierces from the sixth assembling hole 144 and is locked to the seventh assembling hole 314 to achieve auxiliary positioning for the vehicle rack body 14 and the plastic main body 31, thereby enhancing the assembling strength for both devices.

The present invention provides a preferable and feasible children's balancing vehicle. While the means of specific embodiments according to the present invention has been described in the drawings, numerous modifications and variations could be made thereto by those skilled in the art, without departing from the scope of the invention set forth in the claims. The modifications and variations should in a range limited by the specification of the present invention.

What is claimed is:

1. A children balancing vehicle comprising:
    a front vehicle rack having a front fork, wherein a front wheel is assembled to the front fork;
    a stand pipe disposed onto the front vehicle rack, a vehicle rack body connected to a rear of the stand pipe;
    a handle set disposed onto the stand pipe;
    a rear fork that is separate from the vehicle rack body and that is disposed at a rear of the vehicle rack body, wherein a rear wheel is assembled to the rear fork;
    a seat tube passing between the vehicle rack body and the rear fork, wherein a seat is disposed on the seat tube; and
    a fastening component passing through the vehicle rack body, the rear fork and the seat tube so as to fasten the vehicle rack body, the rear fork and the seat tube together,
    wherein an assembling hole in the vehicle rack body, an assembling hole in the rear fork and an assembling hole in the seat tube are aligned with one another and are passed through by the fastening component.

2. The children balancing vehicle of claim 1, wherein the vehicle rack body is a tubular body matable with the rear fork, and a first through-hole vertically pierces through the vehicle rack body and is passed through by the seat tube.

3. The children balancing vehicle of claim 2, wherein rear fork is disposed with a second through-hole fit at the vehicle rack body, and the second through-hole aligns with the first through-hole so that the seat tube sequentially passes through the first through-hole and the second through-hole.

4. The children balancing vehicle of claim 1, wherein the fastening component has a first fastening member and a second fastening member, and the first fastening member sequentially passes through the assembling hole in the vehicle rack body, the assembling hole in the rear fork and the assembling hole in the seat tube, and the second fastening member is provided for fastening the first fastening member from another side of the vehicle rack body.

5. The children balancing vehicle of claim 4, wherein the second fastening member has a protrusion portion and a head portion located at one end of the protrusion portion, and the protrusion portion passes through the assembling hole in the vehicle rack body such that the head portion is exposed to the vehicle rack body.

6. The children balancing vehicle of claim 4, wherein a tail of the first fastening member has a plurality of external screw threads, and the protrusion portion of the second fastening member has correspondingly internal screw threads.

7. The children balancing vehicle of claim 4, wherein the assembling hole in the seat tube is one of a plurality of assembling holes in the seat tube vertically arranged at intervals.

8. The children balancing vehicle of claim 4, wherein at least a set of auxiliary fastening components is further disposed through the vehicle rack body and the rear fork.

9. The children balancing vehicle of claim 8, wherein the auxiliary fastening components have a first auxiliary fastening member and a second auxiliary fastening member fastened to one another, wherein the assembling hole in the vehicle rack body, the assembling hole in the rear fork and the assembling hole in the seat tube constitute first, second and third assembling holes respectively, and wherein a fourth assembling hole and a fifth assembling hole are aligned with one another and disposed through the vehicle rack body and the rear fork respectively.

10. The children balancing vehicle of claim 9, wherein the set of auxiliary fastening components further includes, a third auxiliary fastening member, and a sixth assembling hole and a seventh assembling hole aligned with one another are disposed through the vehicle rack body and the rear fork respectively, the seventh assembling hole has internal screw threads, and the third auxiliary fastening member has a plurality of external screw threads and passes through from the sixth assembling hole and is locked to the seventh assembling hole.

11. A children balancing vehicle comprising:

a front vehicle rack having a front fork, wherein a front wheel is assembled to the front fork;

a stand pipe disposed onto the front vehicle rack, a vehicle rack body connected to a rear of the stand pipe;

a handle set disposed onto the stand pipe;

a rear fork that is separate from the vehicle rack body and that is disposed at a rear of the vehicle rack body, wherein a rear wheel is assembled to the rear fork;

a seat tube passing between the vehicle rack body and the rear fork, wherein a seat is disposed on the seat tube; and a fastening component passing through the vehicle rack body, the rear fork and the seat tube so as to fasten the vehicle rack body, the rear fork and the seat tube together, wherein a first assembling hole, a second assembling hole and a third assembling hole are aligned with one another and extend through the vehicle rack body, the rear fork and the seat tube respectively and are passed through by the fastening component, wherein the fastening component has a first fastening member and a second fastening member, and the first fastening member sequentially passes through the first assembling hole, the second assembling hole and the third assembling hole, and the second fastening member is provided for fastening the first fastening member from another side of the vehicle rack body.

* * * * *